United States Patent [19]

Hirose et al.

[11] Patent Number: 5,060,096
[45] Date of Patent: Oct. 22, 1991

[54] MAGNETIC DISC CLAMPING/SEATING UNIT

[75] Inventors: Yoshio Hirose, Urawa; Kazuhiko Inoue, Tokyo, both of Japan

[73] Assignee: TEAC Corporation, Japan

[21] Appl. No.: 537,504

[22] Filed: Jun. 13, 1990

[30] Foreign Application Priority Data

Aug. 2, 1989 [JP] Japan ................................. 1-200869

[51] Int. Cl.⁵ ............................................ G11B 17/04
[52] U.S. Cl. ............................ 360/99.12; 360/97.01; 360/99.06
[58] Field of Search ............... 360/99.12, 99.06, 99.07, 360/105, 106, 97.01

[56] References Cited

U.S. PATENT DOCUMENTS

| | | | |
|---|---|---|---|
| 4,740,852 | 4/1988 | Shiraishi et al. | 360/99.06 |
| 4,760,477 | 7/1988 | Takikawa | 360/99.12 X |
| 4,864,440 | 9/1989 | Satoh et al. | 360/99.02 |
| 4,878,139 | 10/1989 | Hasegawa | 360/99.06 X |
| 4,941,060 | 7/1990 | Uehara | 360/99.05 |
| 4,965,685 | 10/1990 | Thompson et al. | 360/99.06 X |
| 5,012,374 | 4/1991 | Maeda | 360/105 X |

FOREIGN PATENT DOCUMENTS

61-87261 7/1986 Japan.

Primary Examiner—John H. Wolff
Attorney, Agent, or Firm—Andrus, Sceales, Starke & Sawall

[57] ABSTRACT

A magnetic disc unit into and from which a disc case housing a magnetic disc is loaded and ejected includes a chassis, a magnetic head, a slide member being capable of sliding between a first position and a second position, a latch member fixing said slide member at the first position when the disc case is ejected, being pushed by the disc case inserted in said magnetic disc unit at a time of inserting the disc case and fixing said slide member at the second position when the disc case is loaded into said magnetic disc unit and is positioned at a predetermined set position, an arm member rotated by a sliding operation of said slide member, a clamping member clamping the magnetic disc housed in the disc case and a connection mechanism making said clamping member clamp the magnetic disc when said arm member is positioned at a second rotation position and separating said clamping member from the magnetic disc when said arm member is positioned at a first rotation position.

13 Claims, 7 Drawing Sheets

MAGNETIC DISC CLAMPING/SEATING UNIT

BACKGROUND OF THE INVENTION

The present invention generally relates to a magnetic disc unit, and more particularly to a magnetic disc unit in which a disc case can be loaded by simply inserting it.

For example, a 5 inch floppy disc is housed in a flexible disc case as shown in FIG. 1. In FIG. 1, a disc case 3 is flexible and houses a floppy disc 100. The disc case 3 has a first hole 3a and a second hole 3b. A center hole 100a of the floppy disc 100 and a part around the center hole 100a are exposed by the first hole 3a of the disc case 3. The floppy disc 100 is clamped through the first hole 3a. The magnetic head comes into contact with the floppy disc 100 through the second hole 3b.

In a conventional magnetic disc unit in which the floppy disc 100 housed in the disc case 3 described above is loaded, after an operation in which the disc case 3 is inserted via an insertion opening, an operation lever provided in a front of the unit is rotated by an angle of 90° so that the floppy disc 100 is clamped on the turn table.

In the conventional magnetic disc unit, it is necessary to perform two operations ① an insertion operation of the disc case 3 and ② a rotation operation of the operation lever. Thus, the operation for loading the disc case 3 is relatively troublesome. In addition, it is also possible to operate the operation lever in a state where the disc case is insufficiently inserted so that there are cases when the floppy disc is clamped at a position in the middle of the insertion operation of the disc case 3. In this case, the center hole 100a of the floppy disc 100 suffers damage, and in addition, when the magnetic recording and reproducing is performed when the floppy disc is clamped at a position in the middle of the insertion operation of the disc case 3, the floppy disc eccentrically rotates so that it is impossible for the magnetic head to exactly trace the track on the floppy disc 100.

In the conventional magnetic disc unit for a 3.5 inch floppy disc, the 3.5 inch floppy disc is loaded in one operation. The 3.5 inch floppy disc is housed in a cartridge made of resin, and the cartridge is provided with a shutter which covers an opening formed on the cartridge through which the magnetic head is inserted. That is, the cartridge for the 3.5 inch floppy disc differ from the disc case for the 5 inch floppy disc not only in size but also the structure. The magnetic disc unit for the 3.5 inch floppy disc needs a holder to support the cartridge and an opening mechanism to open the shutter. Thus, because of the above differences, it is difficult to apply the magnetic disc unit for the 3.5 inch floppy disc to the unit for the 5 inch floppy disc.

SUMMARY OF THE INVENTION

Accordingly, a general object of the present invention is to provide a novel and useful magnetic disc unit in which the disadvantages of the aforementioned prior art are eliminated.

A more specific object of the present invention is to provide a magnetic disc unit for loading a magnetic disc (for example, 5 inch floppy disc) housed in a disc case and capable of loading the disc case in one operation.

The above objects of the present invention can be achieved by a magnetic disc unit into and from which a disc case housing a magnetic disc is loaded and ejected comprising, a chassis, a magnetic head provided on the chassis and recording and reproducing data on and from the magnetic disc loaded into the magnetic disc unit, a slide member slidably provided in directions of inserting of the disc case and ejecting thereof on a side end of the chassis, the slide member being capable of sliding between a first position and a second position, a latch member provided on the chassis, the latch member fixing the slid member at the first position when the disc case is ejected, being pushed by the disc case inserted in the magnetic disc unit at a time of inserting the disc case and fixing the slide member at the second position when the disc case is loaded into the magnetic disc unit and is positioned at a predetermined set position, an arm member rotatably provided on the chassis, an end of the arm member engaging with the slide member, the arm member rotated by a sliding operation of the slide member, another end of the arm member being positioned at a side end of the chassis opposite to the end of the side where the slide member is provided, a clamping member clamping the magnetic disc housed in the disc case, and a connection mechanism connecting the arm member to the clamping member, the connection mechanism making the clamping member clamp the magnetic disc when the arm member is positioned at a second rotation position corresponding to the second position for the slide member and separating the clamping member from the magnetic disc when the arm member is positioned at a first rotation position corresponding to the first position, so that when the clamping member clamps the magnetic disc the magnetic head is positioned at a predetermined regular position and recording and reproducing data on and from the magnetic disc.

Additional objects, features and advantages of the present invention will become apparent from the following detailed description when read in conjunction with the accompanying drawings.

DESCRIPTION OF THE PREFERRED EMBODIMENTS

A description will be now given of a preferred embodiment of the present invention with reference to FIG. 2 through FIG. 5C.

Figure 1:
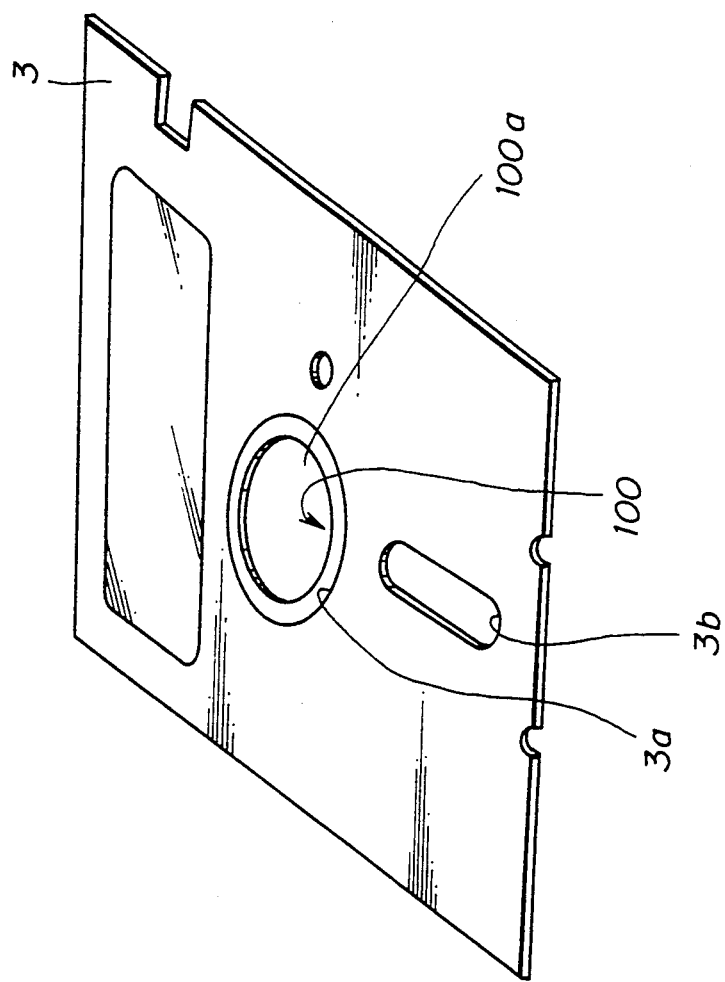
FIG. 1 is a perspective view of the disc case for the 5 inch floppy disc.
Figure 2:
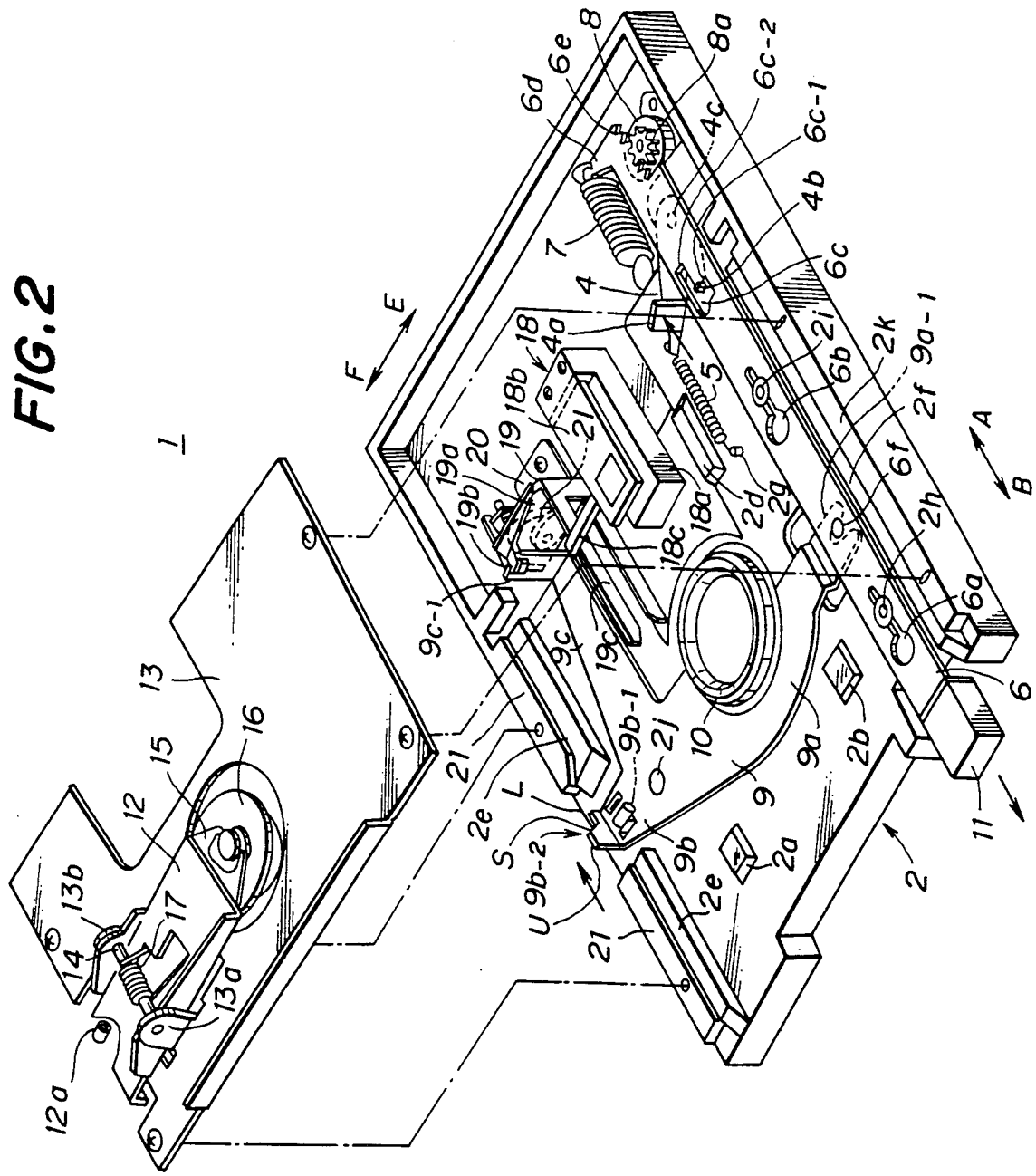
FIG. 2 is a perspective view of the magnetic disc unit of the preferred embodiment according to the present invention.
Figure 3A:
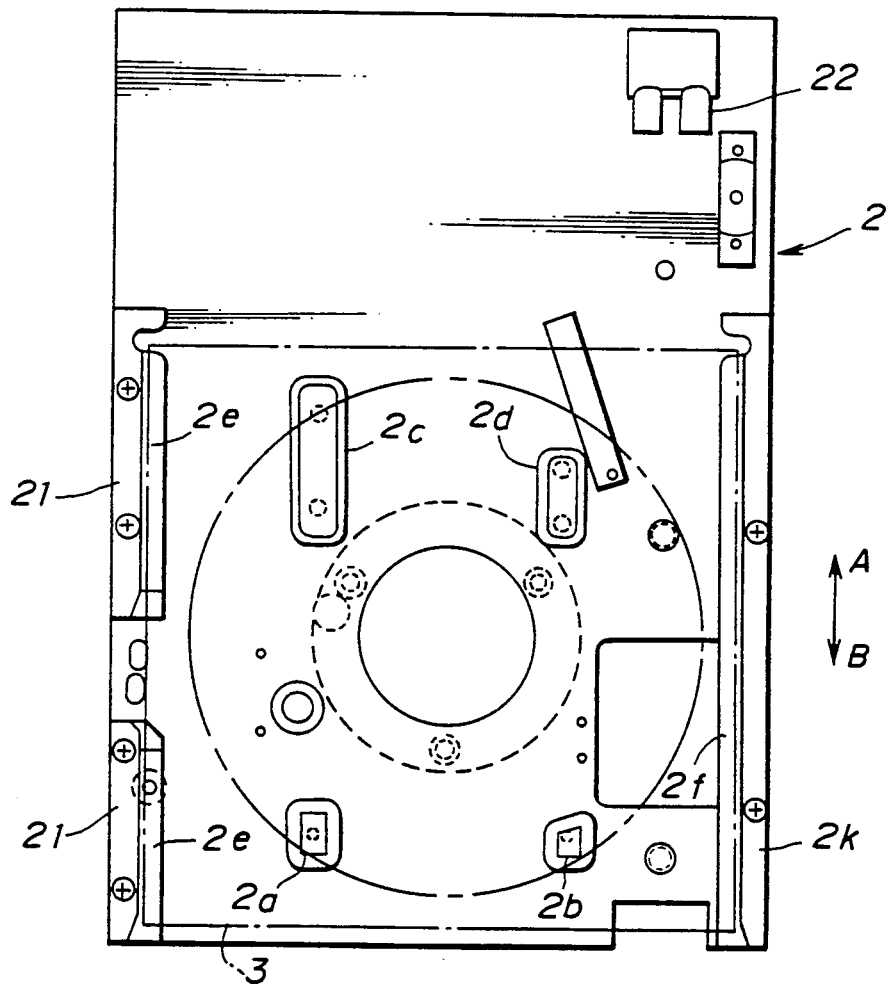
FIGS. 3A and 3B are, respectively, a plan view of the chassis and a front view thereof.
Figure 3B:
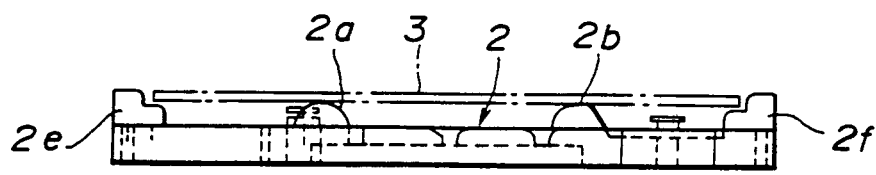

Referring to FIG. 2, a magnetic disc unit 1 has a chassis 2 in which a disc case housing a floppy disc for example, a 5 inch floppy disc) is loaded. The chassis 2 is of a flat-plate-shape and is monolithically formed by, for example, aluminum die casting. Supporting blocks 2a through 2d project from the surface of the chassis 2, as shown in FIGS. 3A and 3B. The disc case 3 (illustrated by a one dotted line in FIG. 3A) loaded in the chassis 2 is supported by the supporting blocks 2a through 2d. The disc case 3 has a structure as shown in FIG. 1. Stepped members 2e and 2f are provided at both sides of the chassis 2 so as to project from the surface of the chassis 2. The stepped members 2e and 2f guide both sides of the disc case 3. A slide bar 6 is provided at a side end of the chassis 2. The slide bar 6 has two slotted holes 6a and 6b. Pins 2h and 2i projecting from the surface of the chassis 2 are loosely inserted into the slotted holes 6a and 6b so that the slide bar 6 can slide in the directions shown by arrows (A) and (B). The direction shown by the arrow (A) corresponds to the insertion direction of the disc case 3, and the direction shown by arrow (B) corresponds to the ejection direction thereof. The slide bar 6 also has an engagement hole 6c which is essentially T-shaped and has a first engagement part 6c-1 and a second engagement part 6c-2. An end of a coil spring 7 engages with the chassis 2, and another end of the coil spring 7 engages with an end part 6d of the slide bar 6. Thus, the slide bar 6 is urged in the direction shown by the arrow (B) by the tensile force of the coil spring 7. A rack 6e is formed at a part adjacent to the end part 6d of the slide bar 6. A damper 8 having a gear 8a is rotatably provided on the chassis 2. The gear 8a engages with the rack 6e of the slide bar 6 so that when the slide bar 6 slides in the directions shown by arrows (A) and (B) a force caused by rotation of the gear 8a is transmitted to the rack 6e of the slide bar 6, and the sliding speed of the slider bar 6 is maintained at a low-speed.

A shaft 4c projects from the surface of the chassis 2 under the slide bar 6. A latch lever 4 is rotatably supported by the shaft 4c. The latch lever 4 has a contact member 4a and a projection member 4b. When the disc case 3 is loaded into the magnetic disc unit 1 in the direction shown by the arrow (A) a leading end of the disc case 3 contacts with and pushes the contact member 4a of the latch lever 4. In the case where the disc case 3 is ejected from this magnetic disc unit 1, the projection member 4b engages with the first engagement part 6c-1 of the engagement hole 6c formed on the slide bar 6. In the case where the disc case 3 is loaded into this magnetic disc unit 1, the projection member 4b engages with the second engagement part 6c-2 of the engagement hole 6c. An end of a pin 2g is set in the chassis 2 A coil spring 5 is provided between the pin 2g and an end part of the latch lever 4. That is, an end of the coil spring 5 engages with the pin 2g and another end of the coil spring 5 engages with the end part of the latch lever 4. Thus, latch lever 4 is urged by the tensile force of the coil spring 5 so as to rotate in the counterclockwise direction.

A link arm 9 is rotatably supported by a shaft 2j projecting from the surface of the chassis 2. This link arm 9 has a first arm 9a, a second arm 9b and a third arm 9c. The first arm 9a is positioned between the slide bar 6 and the shaft 2j and is curved so as to avoid a turn table 10. The second arm 9b is positioned between the shaft 2j and a side of the chassis 2 opposite to the side where the slide bar 6 is provided. The third arm 9c lies in the direction shown by the arrow (A) perpendicular to the first arm 9a and the second arm 9b. An engagement member 9a-1 is formed at the end of the first arm 9a. The engagement member 9a-1 has a forked shape, and is engaged with a pin 6f projecting from an under surface of the slide bar 6. Thus, when the slide bar 6 slides in the direction shown by arrows (A) and (B) the link arm 9 rotates around the center of the shaft 2j In the end of the second arm 9b, a roller 9b-1 is provided in the lower side of the second arm 9b so that the roller 9b-1 rolls on the surface of the chassis 2. A cam 9b-2 projects from the end of the second arm 9b in the direction perpendicular to the surface of the link arm 9. A difference in level such as a step is formed in the cam 9b-2 so that the cam 9b-2 has an upper part (U), a slant part(S) and a lower part (L). The third arm 9c has a engagement member 9c-1 formed by bending the end of the third arm 9c. The engagement member 9c-1 has a forked shape. The length between the pin 6f engaging the engagement member 9a-1 of the first arm 9a and the shaft 2j is greater than the length between the cam 9b-2 formed on the second arm 9b and the shaft 2j. An ejection button 11 is fixed to an end of the slide bar 6 opposite to the end part 6d. The ejection button 11 is pushed in the direction shown by the arrow (A) when the disc case 3 is ejected from this magnetic disc unit 1.

Figure 4A:
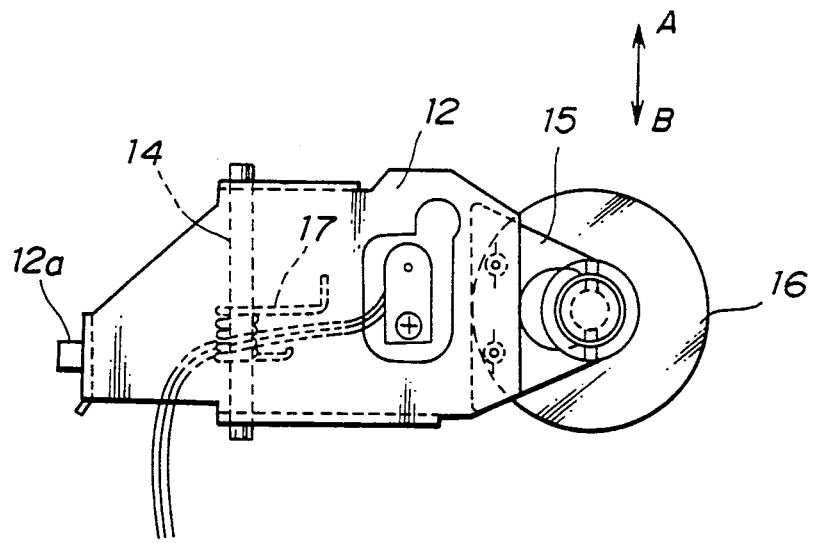
FIGS. 4A through 4C are, respectively, a front view of the clamp arm, a plan view thereof and a side view thereof.
Figure 4B:
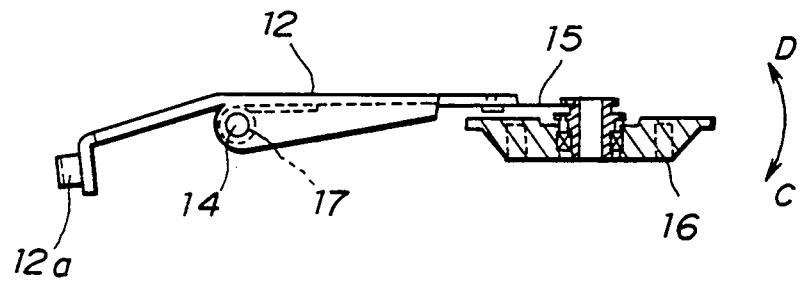
Figure 4C:
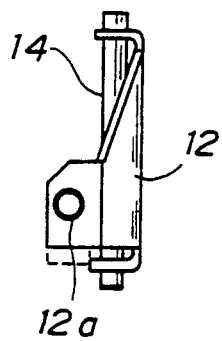

A pair of brackets 13a and 13b is projectedly provided on a base plate 13. A shaft 14 is supported by the pair of brackets 13a and 13b. A clamping arm 12 is supported by the shaft 14 so that the clamping arm 12 pivots on the shaft 14. As shown in FIGS. 4A through 4C, a C-shaped flat spring 15 is fixed to an end of the clamping arm 12, and a roller 12a is rotatably provided on the other end of the clamping arm 12. The roller 12a is in contact with the cam 9b-2 of the second arm 9b. A camper 16 is supported by the end of the C-shaped flat spring 15, and moves up and down in accordance with the pivoting of the clamping arm 12. A torsion spring 17 is wound round the shaft 14. The clamping arm 12 is urged by the torsion spring 17 in the counterclockwise direction (shown by a arrow (D) in FIG. 4B). Both side portions of the base plate 13 are fixed by screws to side members 2k and 2l projecting from the both sides of the chassis 2. Thus, the clamper 16 is held at a position facing the turn table 10, and the roller 12a is held at a position where it is in contact with the cam 9b-2 of the link arm 9.

A head carriage 18 is slidably provided on the chassis 2 in the radial direction (shown by the arrows (A) and (B)) of the floppy disc housed in the disc case 3.

Figure 5A:
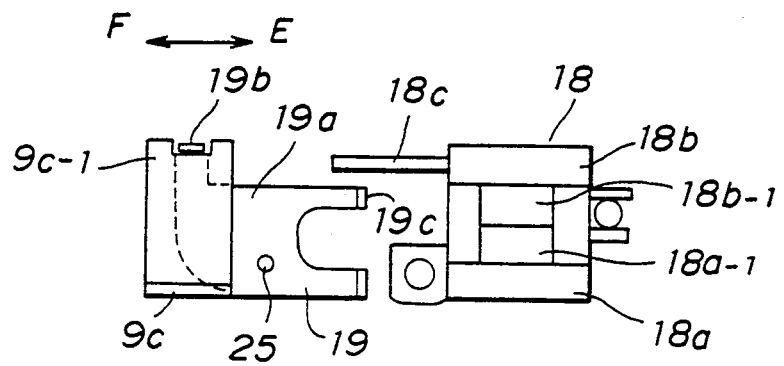
FIGS. 5A through 5C are, respectively, a front view of the head carriage and the lifter, a plan view thereof and a side view trereof.
Figure 5B:
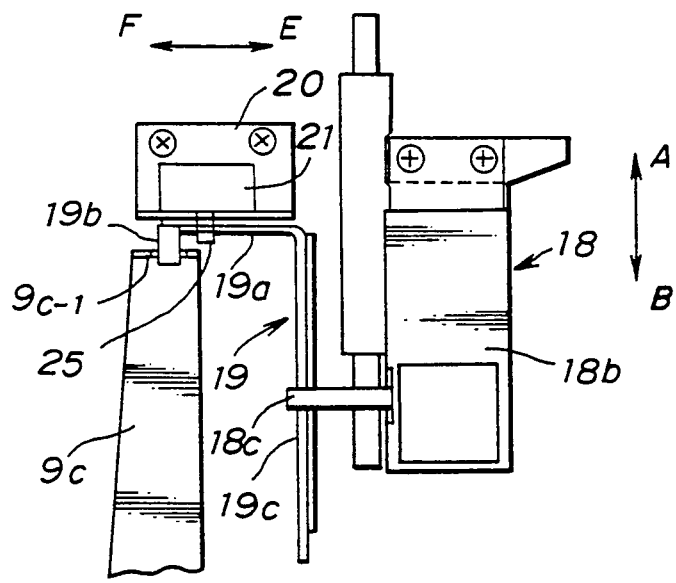
Figure 5C:
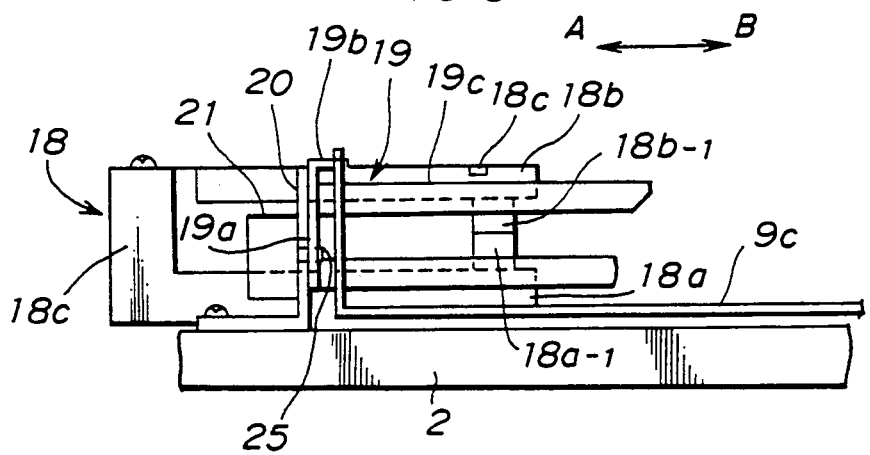

The head carriage 18 has, as shown in FIG. 5A and FIG. 5C, a base 18a, an upper arm 18b and a block 18d. The base 18a and block 18d are integrated. The upper arm 18b is above the base 18a, and an end of the the upper arm 18b is rotatably supported in the up-and-down directions by the block 18d. A lower magnetic head 18a-1 is provided on a upper surface of the base 18a. An upper magnetic head 18b-1 is provided on a lower surface of the upper arm 18b.

Refferring to FIGS. 5A through 5C, a bracket 20 is fixed on the chassis 2 near the head carriage 18 by screws. The bracket 20 is provided with a damper 21 having a shaft 25. A lifter 19 pivots on the shaft 25 of the damper 21. The lifter 19 makes the upper arm 18b of the carriage 18 move up and down. The lifter 19 has a supporting member 19a supported by the shaft 25 of the damper 21, a projection member 19b projecting from the supporting member 19a and engaged with the engagement member 9c-1 of the link arm 9, and a extension member 9c extending from the supporting member 19a in the direction perpendicular to supporting member 19a (i.e. in the direction shown by the arrow (B)).

The extension member 19c has a forked shape, and is positioned under a projection member 18c projecting from the upper arm 18b in the direction shown by a arrow (F). When the disc case 3 is not loaded into the magnetic disc unit 1, the lifter 19 rotates in the counterclockwise direction and is positioned at an upper position so that the projection member 18c is pushed up by the lifter 19 and the upper arm 18b is lifted. The damper 21 slows the rotation of the lifter 19.

Refferring to FIG. 3A, a stopper 22 made of resin and having elasticity is fixed on an end of the chassis 2. When the slide bar 6 slides in the direction shown by the arrow (A) due to the ejecting operation of the disc case 3, the bent end of the slide bar 6 pushes the stopper 22 and the shock produced when the slide bar 6 hits the stopper 22 is softened due to the elasticity of the stopper 22.

A description will now give of the operation of the magnetic disc unit 1 described above.

Figure 6A:
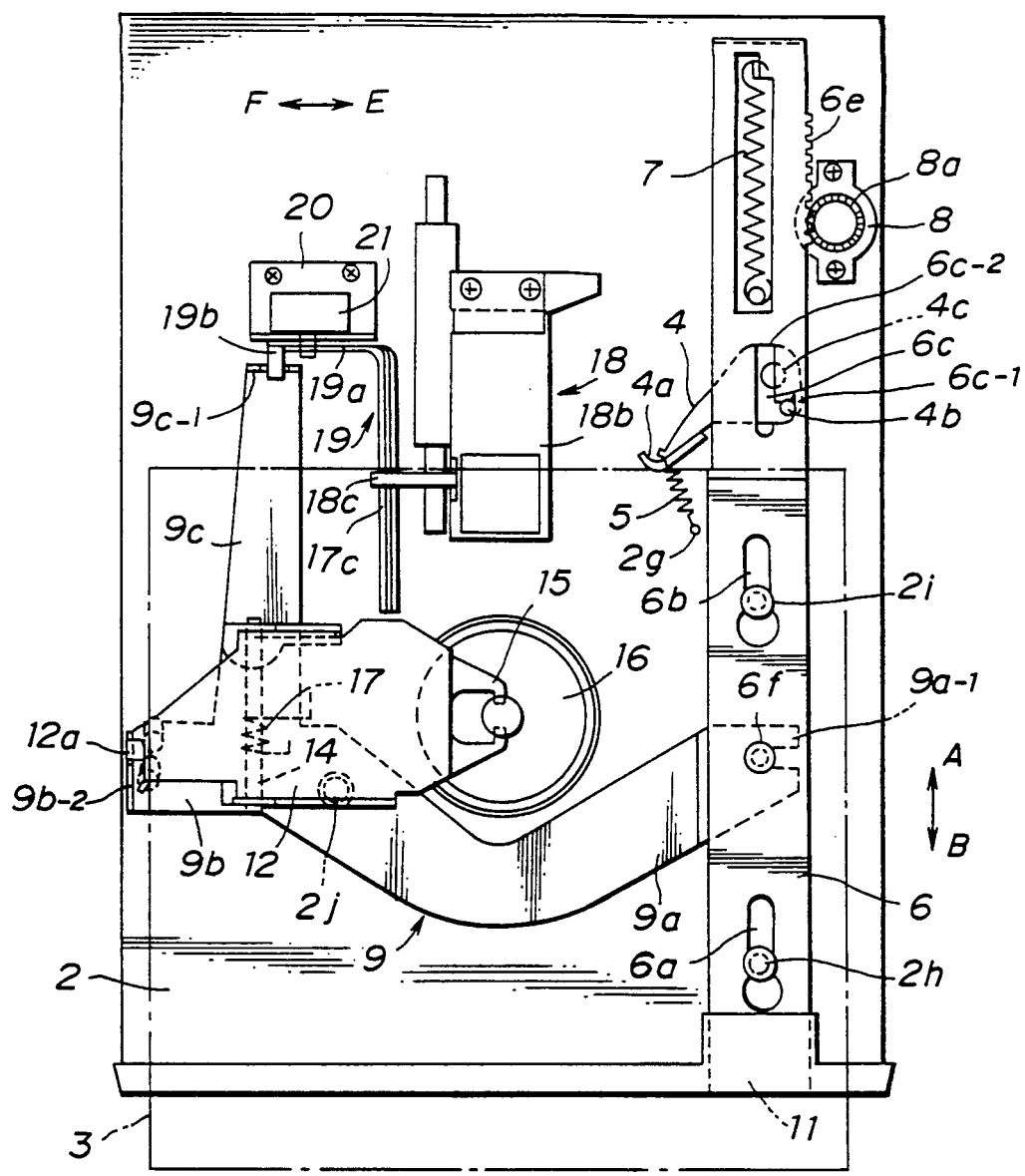
FIGS. 6A and 6B are, respectively, a plan view of a state before loading the disc case or at the time of the ejecting of the disc case and a front view thereof.
Figure 6B:
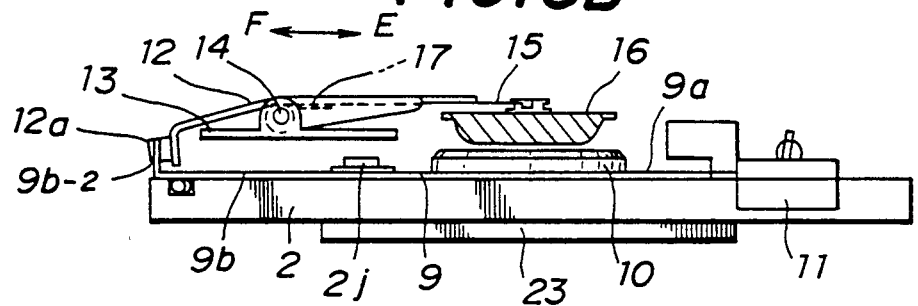

Before the loading of the disc case 3, the magnet disc unit 1 has a state as shown in FIGS. 6A and 6B.

That is, the slider 6 is at a position where the projection member 4b of the latch lever 4 engages with the first engagement part 6c-1 of the engagement hole 6c formed on the slide bar 6. Then, the clamper 16 is at a position separate from the turn table 10. The upper arm 18b of the head carriage 18 is lifted by the lifter 19.

When the disc case 3 is inserted in the magnetic disc unit 1 as shown by the one dotted line in FIG. 6A, the leading end of the disc case 3 is contacted with the contact member 4a of the latch lever 4. Then, when the disc case 3 is further pushed in the direction shown by the arrow (A), the latch lever 4 rotates around the center of the shaft 4c in the clockwise direction. Because of this rotation of the latch lever 4, the projection member 4b of the latch lever 4 is disengaged from the first engagement part 6c-1 formed on the slide bar 6, as shown in FIG. 6A. Then, the slide bar 6 slides in the direction shown by the arrow (B) due to the tensile force of the coil spring 7. The slide bar 6 smoothly moves due to the force produced by the damper 8.

Figure 7A:
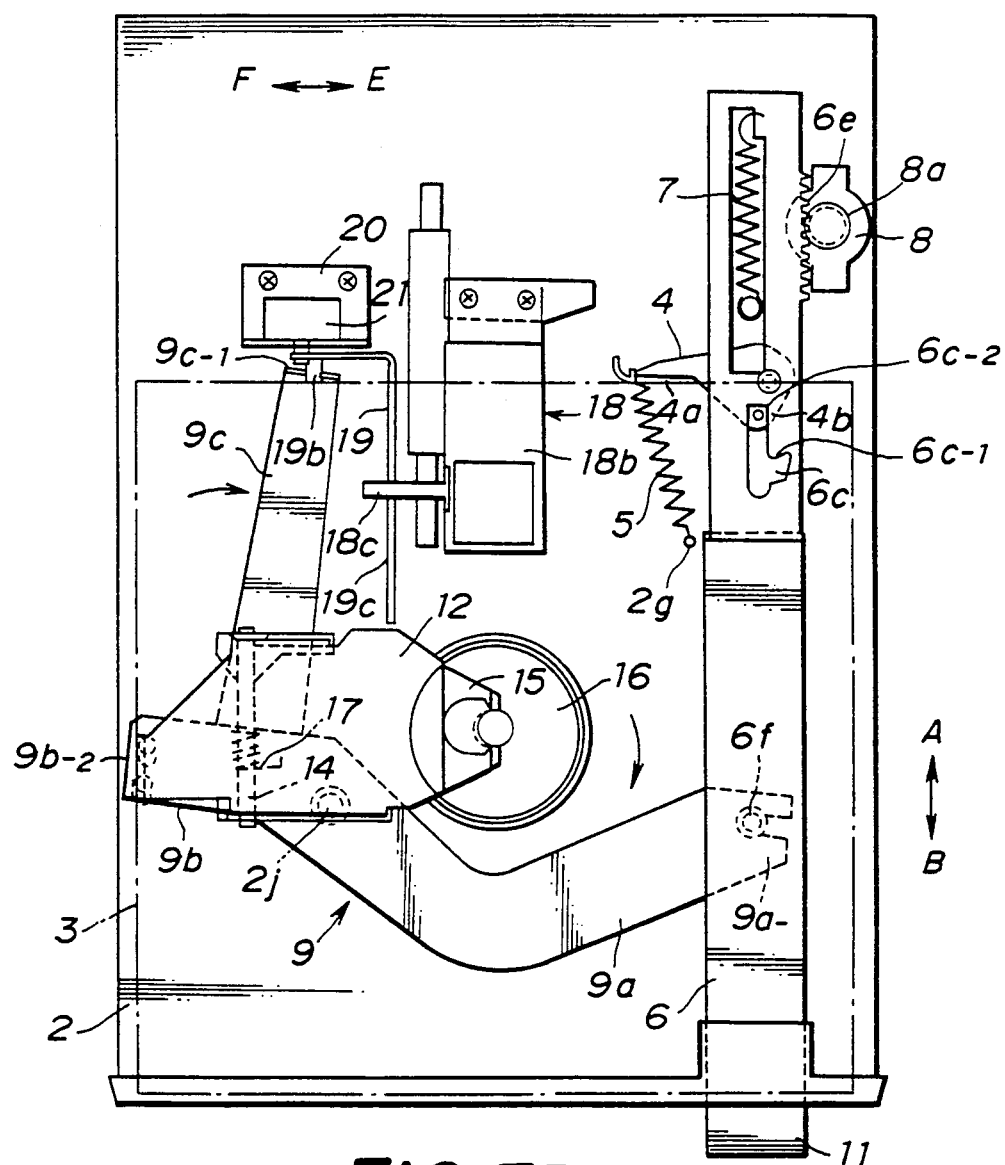
FIGS. 7A and 7B are, respectively, a plan view of a state where the disc case is loaded and a front view thereof.
Figure 7B:
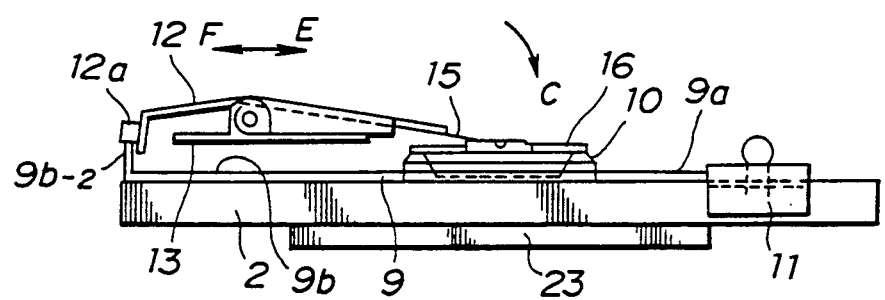

The disc case 3 inserted in the magnetic disc unit 1 as described above reaches a predetermined set position so that a center hole of the magnetic disc housed in the disc case 3 exactly faces the turn table 10. Then, when the slide bar 6 slides in the direction shown by the arrow (B) the link arm 9 engaging with the pin 6f of the slide bar 6 rotates around the center. Of the shaft 2j in the clockwise direction. Because of the rotation of the link arm 9, the cam 9b-2 formed on the second arm 9b of the link arm 9 moves in the direction shown by the arrow (A). The contact position where the roller 12a of the clamping arm 12 is in contact with the cam 9b-2 successively moves from the lower part (L) through the slant part (S) to the upper part (U). Thus, the clamping arm 12 rotates around the center of the shaft 14 in the direction shown by the arrow (C), as shown in FIG. 7(B), so that the clamper 16 goes down. Then, the floppy disc (not shown in FIGS. 7A and 7B) housed in the disc case 3 is clamped on the turn table 10 by the clamper 16. The clamper 16 presses the floppy disc on the turn table 10 due to the pressure force of the C-shaped flat spring 15. Since, when the clamper 16 goes down, the disc case 3 is at the set position, there are no cases where the clamper 16 clamps the floppy disc at a position other than the regular position (the center potion of the floppy disc). Even if the floppy disc is at an arbitrary position in the disc case 3, the floppy disc is clamped at the regular position due to a taper surface of the clamper 16.

When the link arm 9 rotates as described above, the engagement member 9c-1 moves in the direction shown by the arrow (E). Because of this moving of the engagement member 9c-1, the lifter 19 engaging with the engagement member 9c-1 rotates in the clockwise direction, as shown in FIG. 5A. As a result, the projection member 18c supported by the lifter 19 moves down and thus the upper arm 18b of the head carriage 18 moves down. The upper magnetic head 18b-1 is in contact with the surface of the floppy disc. A driving motor 23 makes the turn table 10 rotate so that the floppy disc clamped on the turn table 10 by the clamper 16 rotates. Thus, in this magnetic disc unit 1, the upper magnetic head 18b-1 and the lower magnetic head 18a-1 are in contact, respectively, with the upper surface and the lower surface of the floppy disc so that it is possible to perform the magnetic recording and reproducing.

In the operation for loading the floppy disc into the magnetic disc unit 1, the disc case 3 is inserted in the magnetic disc unit 1. Then, it is possible for the disc case 3 to be easily loaded in the magnetic disc unit 1 in one operation.

Due to the rotation of the link arm 9 which is rotated by the tensile force of the coil spring 7, the clamper 16 clamps the floppy disc and the upper arm 18b of the head carriage 18 moves down. In the link arm 9, the length of the first arm 9a is greater than the length of the second arm 9b so that the force applied on the engagement member 9a-1 is converted to a sufficient clamping force which is transmitted to the clamper 16, on the basis of the principle of the link.

To eject the disc case 3 loaded into the magnetic disc unit 1 as has been described above, it is sufficient to simply push the ejection button 11 in the direction shown by the arrow (A). The end of the slide bar 6 strikes the stopper 22 made of resin, and the slide bar 6 stops at a predetermined ejection position. In this operation of the slide bar 6, the projection member 4b of the latch lever 4 moves along inside the engagement hole 6c, and the latch lever 4 rotates in the counterclockwise direction due to the tensile force of the coil spring 5 so that the projection member 4b of the latch lever 4 engages with the first engagement part 6c-1 of the engagement hole 6c. Thus, the contact member 4a of the latch lever 4 pushes the leading end of the disc case 3 due to the rotation of the latch lever 4 so that the disc case 3 is ejected from the magnetic disc unit 1.

Since the projection member 4b engages with the first engagement part 6c-1 of the engagement hole 6c, the slide bar 6 is held at the ejection position.

The link arm 9 rotates in the counterclockwise direction at a same time as the sliding operation of the slide bar 6. As a result, the contact position of the roller 12a with the cam 9b-2 moves to the lower part (L) of it so that the clamping arm 12 rotates in the direction shown by the arrow (D) due to the pressure force of the torsion spring 17, and the clamper 16 moves up and is separated from the turn table 10. At the same time, the lifter 19 engaging with the link arm 9 rotates in the counterclockwise direction so that lifter 19 lifts the upper arm 18b. All of these related operations are performed at the same time. That is, when the ejection button 11 is pushed, at the same time, the clamper 16 and the upper arm 18b goes up, and the disc case 3 is pushed by the latch lever 4 and ejected.

As has been described above, in the magnetic disc unit according to the present invention, by simply inserting the disc case into the magnetic disc unit, the magnetic disc is clamped on the turn table by the clamper, and the magnetic head is brought into contact with the surface of the magnetic disc and so it becomes possible to record data on and reproduce data from the magnetic disc. In addition, when the disc case is loaded at the predetermined set position the floppy disc is clamped on the turn table so that there are no cases where the floppy disc is clamped at a position other than the regular position. Thus, it is possible to prevent the center hole of the magnetic disc from suffering damage due to the operation of clamping.

The present invention is not limited to the aforementioned embodiments, and variations and modifications may be made without departing from the scope of the claimed invention.

What is claimed is:

1. A magnetic disc unit into and from which a disc case housing a magnetic disc is loaded and ejected, comprising:
   a chassis;
   a magnetic head provided on said chassis and recording and reproducing data on and from the magnetic disc loaded into said magnetic disc unit;
   a slide member slidably provided in directions of inserting of said disc case and ejecting thereof on a side end of said chassis, said slide member being capable of sliding between a first position and a second position;
   a latch member provided on said chassis, said latch member fixing said slid member at the first position when the disc case is ejected, being pushed by the disc case inserted in said magnetic disc unit at a time of inserting the disc case and fixing said slide member at the second position when the disc case is loaded into said magnetic disc unit and is positioned at a predetermined set position;
   an arm member rotatably provided on said chassis, an end of said arm member engaging with said slide member, said arm member rotated by a sliding operation of said slide member, another end of said arm member being positioned at a side end of said chassis opposite to the end of the side where said slide member is provided;
   a clamping member clamping the magnetic disc housed in the disc case; and
   a connection mechanism connecting said arm member to said clamping member, said connection mechanism making said clamping member clamp the magnetic disc when said arm member is positioned at a second rotation position corresponding to the second position for said slide member and separating said clamping member from the magnetic disc when said arm member is positioned at a first rotation position corresponding to the first position, so that when said clamping member clamps the magnetic disc said magnetic head is positioned at a predetermined regular position and records and reproduces data on and from the magnetic disc.

2. A magnetic disc unit as claimed in claim 1, wherein said slide member comprises a first engagement part and a second engagement part, and said latch member includes a projection member which engages with said first engagement part of said slide member when said slide member is fixed at the first position and which engages with said second engagement part of said slide member when said slide member is fixed at the second position.

3. A magnetic disc unit as claimed in claim 2, wherein said slide member includes a engagement hole in which said first engagement part and said second engagement part are formed.

4. A magnetic disc unit as claimed in claim 1, further comprising a damper member maintaining a sliding speed of said slide member at a low speed.

5. A magnetic disc unit as claimed in claim 4, wherein said damper member comprises a gear engaged with a rack formed on said slide member.

6. A magnetic disc unit as claimed in claim 1, wherein said arm member is rotatably supported by a shaft projecting from said chassis and comprises a first arm and a second arm, said first arm provided between said shaft and the end of said arm member engaging with said slide member, said second arm provided between said shaft and the other end of said arm member.

7. A magnetic disc unit as claimed in claim 6, wherein a length of said first arm is greater than a length of said second arm.

8. A magnetic disc unit as claimed in claim 6, wherein said second arm has a roller provided at a end of said second arm and rolling on said chassis.

9. A magnetic disc unit as claimed in claim 6, wherein said connection mechanism comprises a cam having a predetermined shape and a clamping arm , said clamping arm being rotatably supported by a supporting member and having a roller contacting with said cam at an end of said clamping arm, and wherein said clamping member is provided at another end of said clamping arm, so that due to said cam and said clamping arm said clamping member clamps the magnetic disc when said arm member is positioned at said second position and separates the magnetic disc when said arm member is positioned at said first position.

10. A magnetic disc unit as claimed in claim 9, wherein said cam projects from said second arm and has an upper part, a slant part and lower part, so that when said roller of said clamping arm comes into contact with said upper part of said cam said clamping member clamps the magnetic disc and when said roller of said clamping arm comes into contact with said lower part of said cam said clamping member separates from the magnetic disc.

11. A magnetic disc unit as claimed in claim 6, further comprising a second connection mechanism, wherein said arm member further comprises a third arm, said second connection mechanism connecting said third arm to said magnetic head, and said second connection mechanism making said magnetic head positioned at said predetermined regular position when said third arm is positioned at a contact position corresponding to said second rotation position of said arm member and separating said magnetic head from the magnetic disc when said third arm is positioned at a separation position corresponding to said first rotation position of said arm member.

12. A magnetic disc unit as claimed in claim 11, wherein said third arm is provided in a direction perpendicular to said first arm and second arm and at a position near said magnetic head.

13. A magnetic disc unit as claimed in claim 11, wherein said second connection comprises a lift member, said lift member lifting said magnetic head and separating said magnetic head from the magnetic disc when said third arm is positioned at said separating position and moving down said magnetic head and making said magnetic head positioned at said predetermined regular position when said third arm is positioned at said contact position.

* * * * *

UNITED STATES PATENT AND TRADEMARK OFFICE
CERTIFICATE OF CORRECTION

PATENT NO. : 5,060,096

DATED : October 22, 1991

INVENTOR(S) : Hoshio Hirose, et al

Page 1 of 2

It is certified that error appears in the above-identified patent and that said Letters Patent is hereby corrected as shown below:

| | |
|---|---|
| Column 7, line 32 | delete "slid" and substitute therefor ---slide--- |
| Column 7, line 40 | after "member" in the second occurrence, insert ---being--- |
| Column 8, line 14 | after "arm" insert ---being--- |
| Column 8, line 16 | after "arm" insert ---being--- |
| Column 8, line 48 | delete "making" and substitute therefor ---positioning--- |
| Column 8, line 48 | delete "positioned" |
| Column 8, line 65 | delete "making" and substitute therefor ---positioning--- |

UNITED STATES PATENT AND TRADEMARK OFFICE
CERTIFICATE OF CORRECTION

PATENT NO. : 5,060,096

DATED : October 22, 1991

INVENTOR(S) : Hoshio Hirose, et al

It is certified that error appears in the above-indentified patent and that said Letters Patent is hereby corrected as shown below:

Column 8, line 65, delete "positioned".

Signed and Sealed this

Seventh Day of December, 1993

BRUCE LEHMAN

*Attest:*

*Attesting Officer*  *Commissioner of Patents and Trademarks*